UNITED STATES PATENT OFFICE.

GEORGE F. DORAN, OF OMAHA, NEBRASKA.

ART OF CURING MEATS.

1,212,614.  Specification of Letters Patent. Patented Jan. 16, 1917.

No Drawing. Original application filed December 13, 1915, Serial No. 66,506. Divided and this application filed April 29, 1916. Serial No. 94,486.

*To all whom it may concern:*

Be it known that I, GEORGE F. DORAN, a citizen of the United States, residing at Omaha, in the county of Douglas and State of Nebraska, have invented new and useful Improvements in the Art of Curing Meats, of which the following is a specification.

My present invention relates to improvements in the art of curing meats, and the primary objects of the invention are to provide a process whereby a complete cure of packing-house meats may be effected in a more convenient and rapid manner than heretofore; to provide a process which will increase the efficiency of the curing operation; and to provide a process which will produce a milder cure and a better product from a physiological standpoint. To accomplish these results, I utilize a pickling liquor to which is added, in the form of the commercial or chemical salts, soluble nitrites or alkali metal nitrites, preferably sodium nitrite or potassium nitrite.

The present application is a division of my prior application, Serial No. 66,506, filed December 13, 1915. In that application the process is claimed broadly to cover the use of soluble nitrites generally, and the present application is intended to cover the process as carried out with a pickling liquor to which the soluble or alkali metal nitrites are added as chemical salts to the pickling liquor.

Heretofore, the process of curing meats comprised treating the meat with a pickling liquor called "pumping pickle", which pickling liquor consisted of a saturated brine solution containing 3% of sodium or potassium nitrate. According to the present invention, however, a pickling liquor is prepared which consists of a saturated brine solution to which is added about three-fourths per cent. of sodium or potassium nitrate, and from .05% to .35% of a soluble or alkali metal nitrite in the form of the chemical salt, sodium or potassium nitrite being preferably used.

One example of the preferred procedure as applied to the curing of ham-house products may be described as follows:—The products are saturated with the pickling liquor, prepared as just described, by inserting perforated needles in the various parts of the product (preferably in the vital points) and forcing the pickling liquor through the perforated needle by a hand or other pump. After so saturating the products with the pickling liquor, the products are placed in tierces containing a pickling liquor which, for example, may be made up of from 13 to 18% of salt, 1% of sugar, or its equivalent in syrup, and .05% of potassium or sodium nitrite in the form of the chemical salt. The products are then kept at low temperatures in chill rooms or coolers for a period of from 20 to 40 days, this depending on the size of the hams, and at the end of such period, the products are washed and then sent to the smoking room where they are kept for several days exposed to smoke. After this, the products are finished and ready for inspection. In cases where the products are to be cooked before shipping from the plant, as is the case with corned beef or cooked ham, the process is more rapid because of the relatively higher temperatures employed. It is found that boiling temperatures develop the cures rapidly.

Another example of the invention as applied to the treatment of corned beef may be described as follows:—The meat is cut up into pieces about one inch in size and extracted with warm water for thirty minutes, preferably at a temperature of approximately 40° C. Next, the extracted meat is withdrawn from the warm water and immersed in a 70° brine solution containing from .05% to .10% of sodium nitrite or potassium nitrite, in the form of the chemical salt, for a period of one hour and a half, after which time the temperature is brought to the boiling point. When the meat has been boiled sufficiently, the cage containing the meat is withdrawn from the vat and sent to the packing department where it is canned and vacuumed and exposed to live steam under 10 pounds pressure in a closed retort for a period of one hour and a half.

Another example of the process as applied to the treatment of cooked hams may be described as follows:—The raw hams are trimmed free from bones and excess of fat and then pumped with pickling liquor in a manner similar to that described in the first example, this pickling liquor containing .05% to .35% of sodium or potassium nitrite in the form of the chemical salt. The boned hams, after pumping with this pickling liquor, are then placed in tierces containing brine, niter and nitrites, and sugar, or their equivalent, and kept there for a period of time varying from 3 days to 12 days, this depending on the size of the hams, the larger ones requiring the longer treatment. The hams are then placed in a canvas or cloth covering and then inserted into a perforated iron cylinder and compressed until fairly tight. The cylinders with their contents are then placed into tanks containing water or brine heated to a temperature ranging between 140° and 220° F., or a temperature sufficiently high to coagulate albuminous matters, and subjected to this heat for about 20 hours. Brine or water may be used, depending upon whether a mild or a salty flavor is desired by the trade. At the end of this treatment, the cylinders with their contents are removed to a cooler and there allowed to cool down to a low temperature, this causing the hams to assume a firm and fairly permanent shape. The hams may then be twined with a heavy cord to maintain them in permanent shape and they are then ready for shipment, unless a smoky flavor is desired, in which case, the hams are sent to the smoke-house.

Meats cured in accordance with the present invention have a superior and milder flavor as compared with those cured by processes as heretofore used. A considerable percentage of the nitrate formerly used in making the pickling liquor is eliminated, and hence the products do not have an after taste, due to excessive nitrates, and moreover, the products do not have excessive saltiness, due to excessive processing. The products hold up satisfactorily at ordinary temperatures, and the niter content of the meats processed by the present invention has been reduced materially, thus improving the products from a physiological standpoint.

I claim as my invention: —

1. The herein described improvement in the art of curing meats, which comprises treating the meats with a pickling liquor to which has been added soluble nitrites in the form of the chemical salts.

2. The herein described improvement in the art of curing meats, which comprises treating the meats with a pickling liquor to which has been added alkali metal nitrites in the form of the chemical salts.

3. The herein described improvement in the art of curing meats, which comprises treating the meats with a pickling liquor to which has been added sodium nitrite in the form of the chemical salts.

4. The herein described process of curing meats, which comprises treating the same with a pickling liquor containing soluble nitrites in the form of the chemical salts.

5. The herein described process of curing meats, which comprises preparing a pickling liquor consisting of a salt brine solution, an alkali metal nitrate, and an alkali metal nitrite in the form of the chemical salt, and treating the meat with the pickling liquor so prepared.

In testimony whereof I have hereunto set my hand in presence of two subscribing witnesses.

GEORGE F. DORAN.

Witnesses:
  GEO. BACKUS,
  BOYD O. BRAWNER.